(12) United States Patent
Torr et al.

(10) Patent No.: US 8,227,079 B2
(45) Date of Patent: Jul. 24, 2012

(54) TINTED LAMINATED VEHICLE GLAZING

(75) Inventors: Ashley Carl Torr, Aughton (GB); Neil Barton, Windle (GB)

(73) Assignee: Pilkington Group Limited, Merseyside (GB)

( * ) Notice: Subject to any disclaimer, the term of this patent is extended or adjusted under 35 U.S.C. 154(b) by 206 days.

(21) Appl. No.: 12/602,743

(22) PCT Filed: Jun. 5, 2008

(86) PCT No.: PCT/GB2008/001919
§ 371 (c)(1),
(2), (4) Date: Dec. 2, 2009

(87) PCT Pub. No.: WO2008/149093
PCT Pub. Date: Dec. 11, 2008

(65) Prior Publication Data
US 2010/0189996 A1    Jul. 29, 2010

(30) Foreign Application Priority Data

Jun. 6, 2007    (GB) .................................. 0710808.7

(51) Int. Cl.
*B32B 17/10*    (2006.01)
(52) U.S. Cl. ..................... 428/332; 428/425.6; 428/430; 428/436; 428/437; 428/441; 428/442
(58) Field of Classification Search .................. 428/437, 428/441, 332, 425.6, 430, 436, 442
See application file for complete search history.

(56) References Cited

U.S. PATENT DOCUMENTS

| | | |
|---|---|---|
| 5,077,133 A | 12/1991 | Cheng |
| 5,214,008 A | 5/1993 | Beckwith et al. |
| 6,068,914 A | 5/2000 | Boire et al. |

(Continued)

FOREIGN PATENT DOCUMENTS

EP    0488110 A1    6/1992

(Continued)

OTHER PUBLICATIONS

International Search Report (PCT/ISA/210) for PCT/GB2008/001919 mailed Sep. 12, 2008.

(Continued)

*Primary Examiner* — D. S. Nakarani
(74) *Attorney, Agent, or Firm* — Buchanan Ingersoll & Rooney PC

(57) ABSTRACT

A laminated vehicle glazing, suitable for use with an optical sensor (for example a LIDAR type sensor), comprises first and second plies of glazing material joined together by a ply of interlayer material between them, and either: a) the first ply is a pane of body-tinted glass having a colorant portion consisting of 0.70 to 1.00% by weight total iron (calculated as $Fe_2O_3$), 0 to 1.0% titania and 0 to 2.0% ceria, such that the glazing has a transmittance of at least 30% in the wavelength range 400 to 2100 nm, or b) the first ply of glazing material is a pane of body-tinted glass having a colorant portion consisting of 0.30 to 0.80 by weight total iron (calculated as $Fe_2O_3$), 0 to 1.0% titania (calculated as $TiO_2$) and 0 to 2.0% ceria (calculated as $CeO_2$), and the ply of interlayer material is a solar (IR) absorbing material, such that the glazing has a transmittance of at least 30% in the wavelength range 750 to 1300 nm.

17 Claims, 5 Drawing Sheets

U.S. PATENT DOCUMENTS

| | | |
|---|---|---|
| 6,506,487 B2 | 1/2003 | Nagai |
| 6,524,685 B1 * | 2/2003 | Torr et al. .................. 428/213 |
| 6,686,032 B1 | 2/2004 | Nagai |
| 7,745,838 B2 | 6/2010 | Lefevre |
| 2006/0125919 A1 * | 6/2006 | Camilleri et al. ............. 348/148 |
| 2006/0250711 A1 * | 11/2006 | Noguchi et al. ............. 359/883 |

FOREIGN PATENT DOCUMENTS

| | | |
|---|---|---|
| EP | 0616883 A2 | 9/1994 |
| EP | 0979804 A1 | 2/2000 |
| EP | 1462244 A1 | 9/2004 |
| WO | WO 94/19705 A | 9/1994 |
| WO | WO 01/19748 A1 | 3/2001 |
| WO | WO 2004/062908 A2 | 7/2004 |
| WO | WO 2006/072797 A1 | 7/2006 |
| WO | WO 2007/093822 A1 | 8/2007 |

OTHER PUBLICATIONS

UK Search Report Under Section 17 dated Sep. 24, 2007 issued in the corresponding GB Application No. 0710808.7.

* cited by examiner

TINTED LAMINATED VEHICLE GLAZING

The present invention relates to a tinted laminated vehicle glazing which is suitable for use with an optical sensor.

It is known to provide body-tinted automotive glazings which are suitable for use with optical sensors. An optical sensor is one which uses light to detect a condition which it then quantitatively describes; "light" being electromagnetic radiation extending from the visible and into the infrared region of the spectrum (having a wavelength in the range of approximately 400 nm to 3 µm). A minimum transmission of approximately 30% in this range is currently desirable. EP 1 462 244 A1 describes such blue and grey body-tinted laminated glazings. At least one of the plies comprised in a laminate is body-tinted with colourants including iron and cobalt and/or selenium. Although such glazings are aesthetically pleasing, many vehicle manufacturers still request less obviously coloured glazings, and a green-tinted glazing may often be the preferred choice.

In addition to aesthetic appeal, an increasingly important concern of vehicle manufacturers is to ensure that glazings destined to be fitted in their vehicles possess some degree of solar control, i.e. the amount of incident visible light and solar heat transmitted by the glazings is regulated in some way. A maximum transmitted total energy (TE) of around 60% (measured according to Parry Moon, Air Mass 2) appears to be a currently acceptable upper limit. Generally, the more highly tinted a glazing is (i.e. the darker the tint it has), the lower its TE will be.

Of course, any TE requirement may have to be balanced against legal visible light transmission (LT) requirements, depending on the position in a vehicle in which a particular glazing is to be fitted. For example in Europe, a windscreen must currently transmit 75% or more of incident visible light (when measured with CIE Illuminant A).

In combining the demands for a less obviously tinted glazing preferably having TE less than 60% which is suitable for use with an optical sensor, it has been determined that the following glazing construction is compliant:

Tinted glass ply (2.6 mm)/Clear interlayer ply (0.76 mm)/Clear glass ply (2.1 mm) wherein the tinted glass ply is tinted by use of 0.60% by weight total iron (calculated as $Fe_2O_3$) and the clear glass ply includes only 0.12% by weight total iron. The ply of interlayer material is made from polyvinyl butyral (PVB). This glazing construction leads to an $LT_A$ of 81.5%, TE of 57.8% and a minimum of 32% transmission over the wavelength range 400 to 2100 nm. A plot of percentage transmission (y-axis) against wavelength (nm)(x-axis) for this glazing is shown in FIG. 1 of the accompanying drawings. As a result, this glazing is suitable for use with an optical sensor, and because of its optical properties, may be used as a windscreen in a vehicle.

However, in addition to the solar control and optical-sensor compatibility requirements, there is a growing trend in the automotive industry for lighter weight glazings so as to reduce the overall weight of a vehicle. As climate change becomes an increasingly important global issue, so does the desire to reduce vehicle emissions. One way to achieve this is by reducing the fuel consumption of a vehicle, by reducing its weight. One of the ways of reducing the weight of a vehicle is to reduce the weight of its glazings. This may be done by reducing one or more of their thicknesses.

Unfortunately, simply reducing the thickness of the green-tinted glazing above, for example by reducing the thickness of the tinted glass ply from 2.6 mm to 2.1 mm, does not provide an adequate solution. Although the light transmission and transmission in the range 400 to 2100 nm remain acceptable, the total energy transmission (TE) increases to an unacceptably high level. Conventional wisdom suggests that increasing the amount of iron in the tinted glass ply (at 2.1 mm thickness) ought to sufficiently reduce the energy transmission to an acceptable level. However in doing so, transmission in the range 400 to 2100 nm drops below 30%, which is an undesirably low level.

It is therefore an object of the present invention to provide a lighter weight, tinted laminated vehicle glazing that meets vehicle manufacturers' energy transmission requirements and is suitable for use with an optical sensor.

Accordingly in a first aspect, the present invention provides a laminated vehicle glazing, suitable for use with an optical sensor, comprising:

first and second plies of glazing material joined together by a ply of interlayer material between them, the first ply of glazing material being a pane of body-tinted glass having a colourant portion consisting of 0.70 to 1.0% by weight total iron (calculated as $Fe_2O_3$), 0 to 1.0% titania (calculated as $TiO_2$) and 0 to 2.0% ceria (calculated as $CeO_2$), wherein the glazing has a transmittance of at least 30% in the wavelength range 400 to 2100 nm.

This wavelength range corresponds to the visible and near to middle infrared regions of the electromagnetic spectrum—a range which may typically correspond with operation of many optical sensors. Surprisingly it was discovered that such a laminated glazing is able to meet the requirement of being lighter weight whilst exhibiting a desirable TE and having the ability to be used with an optical sensor.

Preferably the glazing has a transmittance of at least 32%, further preferably at least 35%, in the wavelength range 750 to 1300 nm. This narrower wavelength range covering the near-infrared region may correspond more closely to one or more optical sensors currently under consideration for use with a vehicle glazing, especially a windscreen. Advantageously the glazing may have a transmittance of at least 38% at 905 nm, at which wavelength a number of optical sensors (to be described in more detail below) optimally operate.

According to a second aspect of the present invention, there is provided a laminated vehicle glazing, suitable for use with an optical sensor, comprising:

first and second plies of glazing material joined together by a ply of interlayer material between them, the first ply of glazing material being a pane of body-tinted glass having a colourant portion consisting of 0.30 to 0.80 by weight total iron (calculated as $Fe_2O_3$), 0 to 1.0% titania (calculated as $TiO_2$) and 0 to 2.0% ceria (calculated as $CeO_2$), and the ply of interlayer material being a solar absorbing material, wherein the glazing has a transmittance of at least 30% in the wavelength range 750 to 1300 nm.

Preferably the glazing has a transmittance of at least 35% in the wavelength range 750 to 1300 mm Further preferably the glazing has a transmittance of at least 38% in the wavelength range 750 to 1100 nm. Beneficially the glazing may have a transmittance of at least 45% at 905 nm.

Advantageously, the optical sensor may be a light detection and ranging (LIDAR) type of sensor. Such LIDAR sensors include pedestrian detection sensors, pre-crash sensors, for example closing velocity (CV) sensors and adaptive cruise control (ACC) sensors, which all work to improve the safety of vehicles. For example, a pre-crash sensor is a sensor that may be able to reduce the severity, or even completely avoid, road traffic accidents at lower speeds. In particular a CV sensor usually forms part of a pre-crash system which may assist the driver of a vehicle in braking if there is a risk of a rear-end collision, as well as optimally tightening seatbelts and activating both driver and passenger airbags at the right moment.

In the first aspect of the invention, the pane of tinted glass preferably has a total iron content of 0.70 to 0.80%, further preferably around 0.75%. In the second aspect of the invention, the pane of tinted glass preferably has a total iron content of 0.40 to 0.60%, further preferably around 0.55%. When titania is also present in the pane of tinted glass, it is preferably in an amount greater than 0.05%, further preferably around 0.2%. When ceria is also present in the glass, it is preferably in an amount greater than 0.5%, further preferably around 1.0%. The base glass of the tinted glass may typically have the following composition (by weight):

| | |
|---|---|
| $SiO_2$ | 70-75% |
| $Al_2O_3$ | 0-5% |
| $Na_2O$ | 10-15% |
| $K_2O$ | 0-5% |
| MgO | 0-10% |
| CaO | 5-15% |
| $SO_3$ | 0-2% |

The tinted glass may further comprise impurities including oxides of chromium, manganese, cerium, zirconium, barium, strontium and boron.

In the first aspect of the invention, the ply of interlayer material may be a flexible plastics material, which may be clear or body-tinted. Suitable interlayer materials include polyvinyl chloride (PVC), polyurethane (PU), ethyl vinyl acetate (EVA), polyethylene terephthalate (PET) or polyvinyl butyral (PVB), the most common choice for lamination being PVB. The ply of interlayer material is typically provided in a thickness of between 0.38 and 1.1 mm, but most commonly 0.76 mm.

In the second aspect of the invention, the ply of solar absorbing interlayer material preferably absorbs infrared radiation (IRR), for example when it comprises tin-doped indium oxide, lanthanum hexaboride or other such suitable IRR absorbing material. By describing a sheet of interlayer material as being "IR absorbing" it is meant that when such a sheet (in 0.76 mm thickness) is interleaved between two pieces of clear glass (each of 2.1 mm thickness), the resulting laminate has a selectivity greater than 0.5 and preferably greater than 1, where the "selectivity" is calculated by dividing the percentage visible light transmission by the percentage total energy, i.e. $LT_A/TE$, each measured for the laminate.

Although the IRR absorbing material may extend over substantially the whole surface area of the glazing, it may alternatively extend over only an upper portion of the surface area of the glazing ("upper" relative to the orientation of the glazing when installed in a vehicle). This upper portion may correspond to the area of a glazing commonly referred to as a shadeband in a vehicle windscreen. Advantageously in either of these circumstances, potential interference of the IR absorbing material with operation of an optical sensor may be minimised/prevented by physical removal of a portion of the IR absorbing material in the region of the sensor (and replacement with an appropriately sized piece of, e.g. clear PVB), or by laser "bleaching" an area of the IR absorbing material in the region of the sensor, e.g. as taught in WO 2006/072797.

A glazing according to both the first and second aspects of the invention may have a visible light transmittance ($LT_A$) greater than or equal to 70% and a total energy transmittance (TE) less than or equal to 60% at thicknesses greater than or equal to approximately 4.2 mm (preferably around 5 mm). Such a glazing meets the current demand for a reasonably reduced degree of transmitted energy whilst maintaining high visible light transmission.

Preferably however the glazing has a visible light transmittance ($LT_A$) greater than or equal to 75% and a total energy transmittance (TE) less than or equal to 60% (preferably around 58%) at thicknesses greater than or equal to approximately 4.2 mm (preferably around 5 mm). The very high light transmission of this glazing means that it may be installed in any aperture in a vehicle, including as a windscreen in a vehicle destined for the European market.

The pane of body-tinted glass comprised in the glazing may have a thickness of less than 2.6 mm, preferably around 2.1 mm. In this thickness, an optimum balance between the weight of the glass (and the glazing) and its solar control performance may be achieved.

The second ply of glazing material may be a pane of clear glass, which may have a thickness less than 2.6 mm, preferably 2.1 mm or less, further preferably around 1.6 mm. Of course clear glass, itself having $LT_A$ of around 89% in 3 mm thickness, typically will not have any significant influence the visible light transmittance, total energy transmittance (TE) or transmittance in the range 400 to 2100 nm of the glazing. Its role is to provide extra rigidity to the laminate, and as such in the thicknesses quoted, an optimum balance may be achieved between its weight and the rigidity it imparts.

The overall thickness of the glazing may therefore be less than 5.7 mm, preferably around 5.2 mm and possibly as little as around 4.7 mm, for its reduced weight to have an effect.

It may be that a laminated vehicle glazing according to the invention has an optical sensor, especially a LIDAR sensor, mounted on its innermost surface. The innermost surface of the glazing is the surface of the inner glass ply which faces inwardly into a vehicle into which the glazing may be fitted. The optical sensor may be attached by use of a transparent, durable thin film adhesive.

Preferably the glazing has a colour specified by the colour coordinates $-6 \leq a^* \leq -2$ and $0 \leq b^* \leq 3$, further preferably by the coordinates $-5 \leq a^* \leq -3$ and $0.5 \leq b^* \leq 2.5$. These coordinates are measured using the D65 Illuminant with a 10° observer angle.

A laminated vehicle glazing according to the invention may be fitted into any window opening in the bodywork of a vehicle. It may especially be used as a windscreen.

For a better understanding, the present invention will now be more particularly described, by way of non-limiting example, with reference to and as shown in the accompanying schematic drawings (not to scale) and plots wherein.

Figure 1:
FIG. 1 is a plot of percentage transmission (y-axis) against wavelength (nm)(x-axis) for the prior art glazing discussed earlier in the preamble to the invention.
Figure 2:
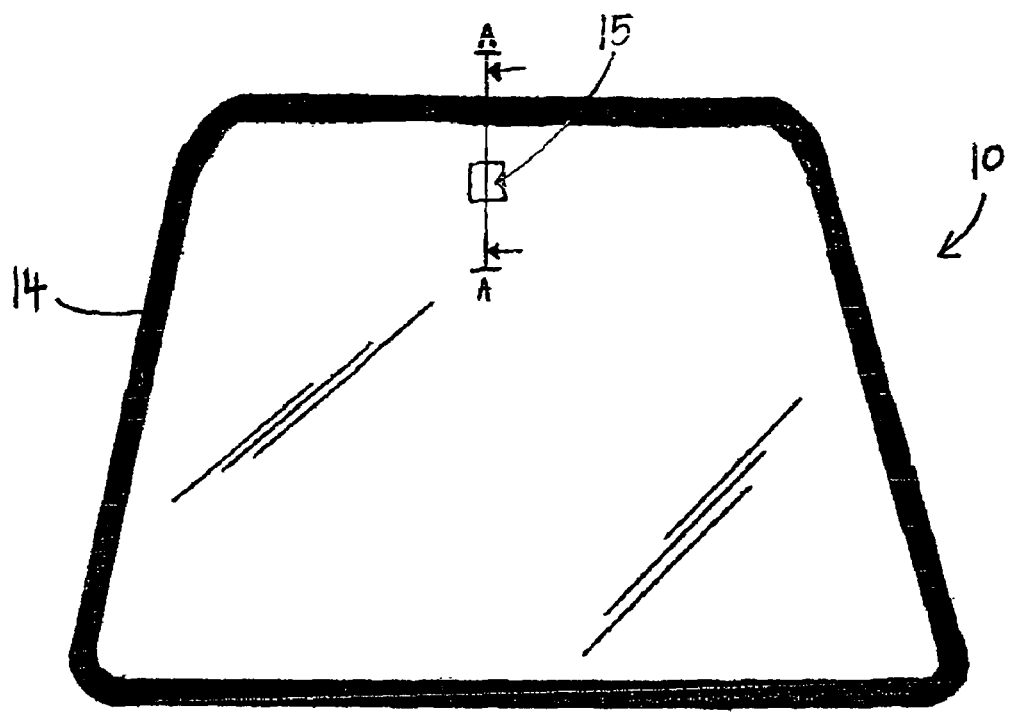
FIG. 2 is plan view of a laminated vehicle glazing according to the invention.

FIG. 2 shows a laminated vehicle glazing, in the form of a windscreen 10. Around the periphery of windscreen 10 there is an obscuration band 14, which is there to disguise and protect the sealant (not shown) that is used to fix the glazing into a vehicle (not shown). Obscuration band 14 is made from opaque ink that has been screen printed onto the glazing and subsequently fired. However, it may be composed of and applied using any other known means, or it need not be there at all.

An optical sensor, in the form of a LIDAR-type CV sensor 15 is mounted in the upper half of windscreen 10. A CV sensor such as this one is currently available from Continental Teves AG & Co. oHG, PO Box 900120, D-60441 Frankfurt, Guerickestrasse 7, Germany. CV sensor 15 is attached to the innermost surface of glazing 10 by adhesive 16, or by use of a bracket (not shown), normally in a separate step after production of the glazing.

Figure 3:
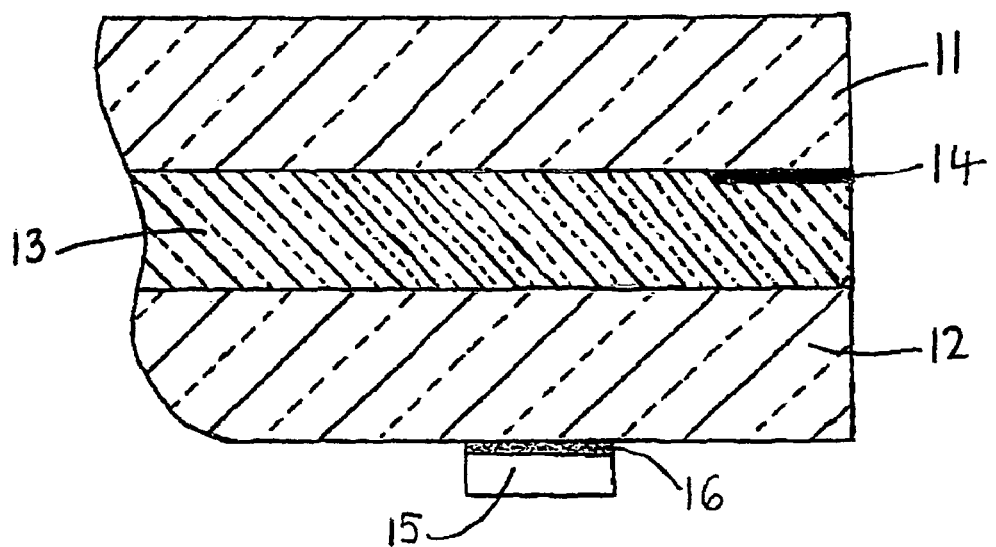
FIG. 3 is a cross-sectional view taken along the line A-A of FIG. 2.

FIG. 3 provides more detail about the construction of windscreen 10 in that it comprises outer ply of glazing material, in the form of a pane of green body-tinted glass 11 and inner pane of glazing material, in the form of a pane of clear glass 12. Interleaved between outer pane 11 and inner pane 12 is a ply of interlayer material 13, which has a thickness of 0.76 mm. Although obscuration band 14 is shown as being on the inner surface of outer pane 11 (known in the art as "surface 2"), it is equally possible that it could instead or in addition be on the outer surface of inner pane 12 (known in the art as "surface 4").

Green-tinted glass ply 11, when according to the first aspect of the invention, has a base glass composition including (by weight) 72.49% $SiO_2$, 0.14% $Al_2O_3$, 13.59% $Na_2O$, 0.05% $K_2O$, 8.66% CaO, 3.93% MgO, 0.13% $SO_3$ and impurities, and a colourant portion consisting of (by weight) 0.75% total iron (calculated as $Fe_2O_3$) and 0.26% $TiO_2$. Glass of this composition exhibits, at 2.1 mm, an $LT_A$ of 82.5% and TE of 64.7%. It has a dominant wavelength of 522 nm and an excitation purity of 1.2% (both measured using Illuminant D65 and a 10° observer angle). Its colour is defined as $a^*=-3.7$ and $b^*=1.7$. Such a glass is currently available as EZKOOL™ from Pilkington Group Limited, Prescot Road, St Helens, WA10 3TT, United Kingdom.

Green-tinted glass ply 11, when according to the second aspect of the invention, has a base glass composition including (by weight) 72.49% $SiO_2$, 0.14% $Al_2O_3$, 13.59% $Na_2O$, 0.05% $K_2O$, 8.66% CaO, 3.93% MgO, 0.13% $SO_3$ and impurities, and a colourant portion consisting of (by weight) 0.56% total iron (calculated as $Fe_2O_3$). Glass of this composition exhibits, at 2.1 mm, an $LT_A$ of 85% and TE of 70%. Its colour is defined as $a^*=-3.1$ and $b^*=0.7$. Such a light-green tinted glass is also currently available from Pilkington Group Limited.

Inner glass ply 12 is a clear glass ply which has a typical composition including: 72.1% $SiO_2$, 1.1% $Al_2O_3$, 13.5% $Na_2O$, 0.6% $K_2O$, 8.5% CaO, 3.9% MgO, 0.10% $Fe_2O_3$ and 0.2% $SO_3$. For the avoidance of doubt, although outer glass ply 11 has been described as the glass ply that is tinted, it is equally possible that inner glass ply 12 could be tinted alternatively or additionally to outer glass ply 11.

Figure 4:
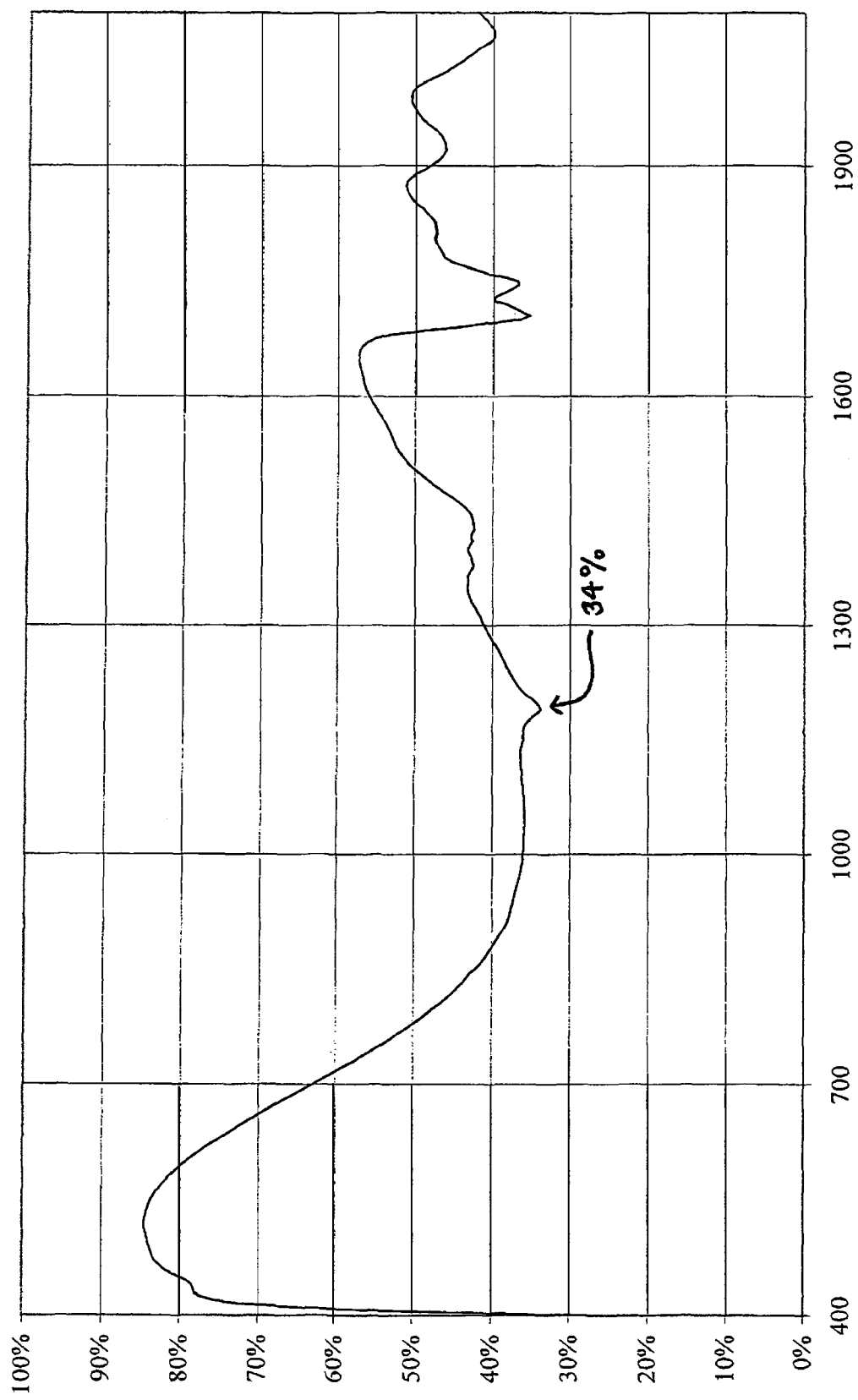
FIG. 4 is a plot similar to that shown in FIG. 1 but for a first embodiment of the invention.

Laminated glazing 10 has a thickness of 4.96 mm when constructed from outer glass ply 11 and inner glass ply 12, each of 2.1 mm thickness, and clear PVB interlayer ply 13 of 0.76 mm thickness. In the case when glass ply 11 is green tinted (EZKOOL™) and glass ply 12 is clear glass, glazing 10 exhibits 80.9% $LT_A$ and 58.1 TE. FIG. 4 shows the transmission curve for this glazing over the wavelength range 400-2100 nm; glazing 10 exhibits 34% transmission in the range 750-1300 nm. At 905 nm, its transmission is 38%. Its overall tint is defined by $a^*=-4.9$ and $b^*=1.8$.

Figure 5:
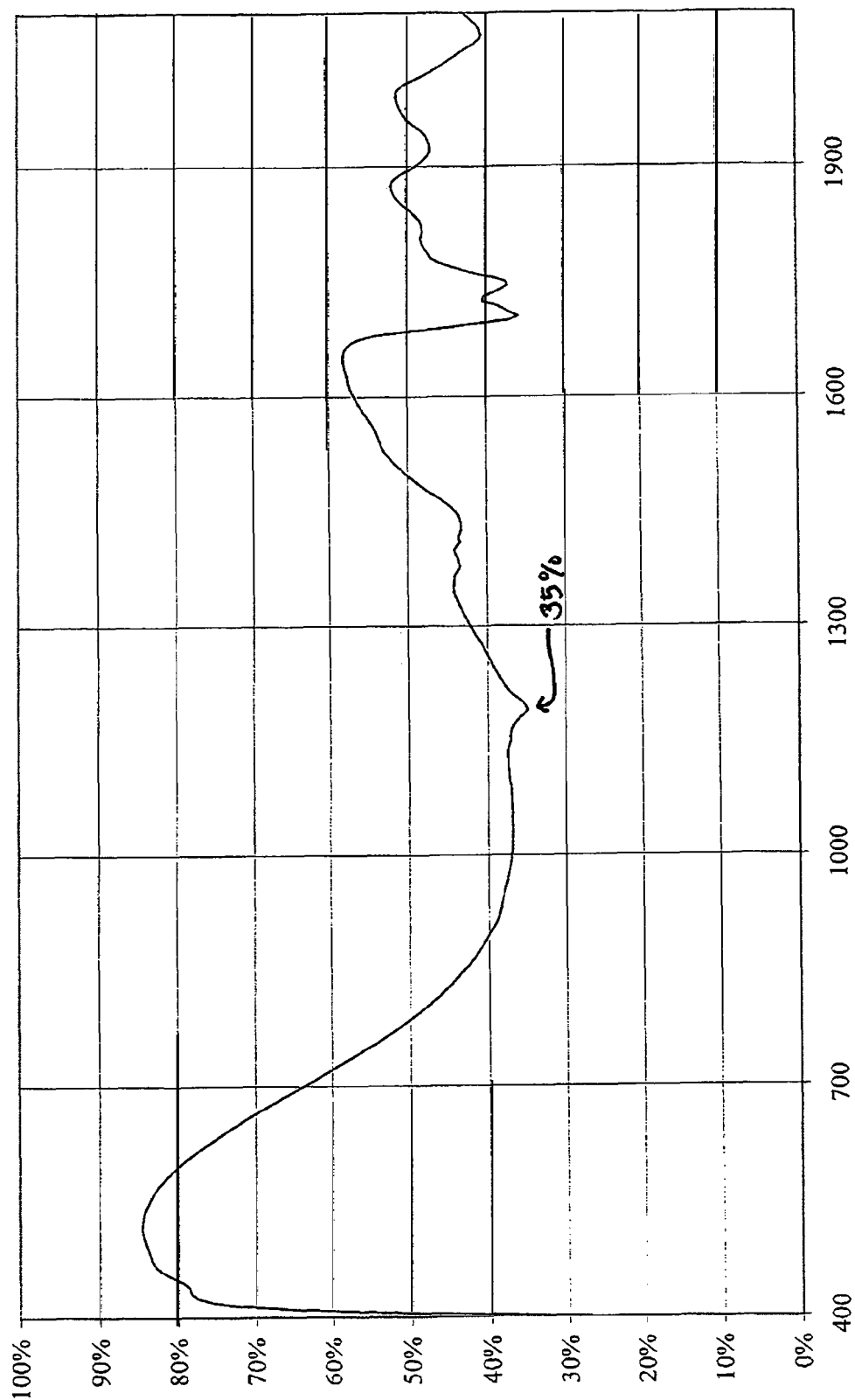
FIG. 5 is a plot similar to that shown in FIGS. 1 and 4 but for a second embodiment of the invention and FIG. 6 is a plot similar to that shown in FIGS. 1, 4 and 5 but for a third embodiment of the invention.

Laminated glazing 10 has a thickness of 4.46 mm when constructed from outer glass ply 11 in 2.1 mm thickness, inner glass ply 12 in 1.6 mm thickness, and clear PVB interlayer ply 13 in 0.76 mm thickness. When glass ply 11 is green tinted (EZKOOL™) and glass ply 12 is clear glass, glazing 10 exhibits 81.2% $LT_A$ and 58.7 TE. FIG. 5 shows the transmission curve for this glazing over the wavelength range 400-2100 nm; glazing 10 exhibits 35% transmission in the range 750-1300 nm. At 905 nm, its transmission is 39%. Its overall tint is defined by $a^*=-4.8$ and $b^*=1.8$.

Figure 6:
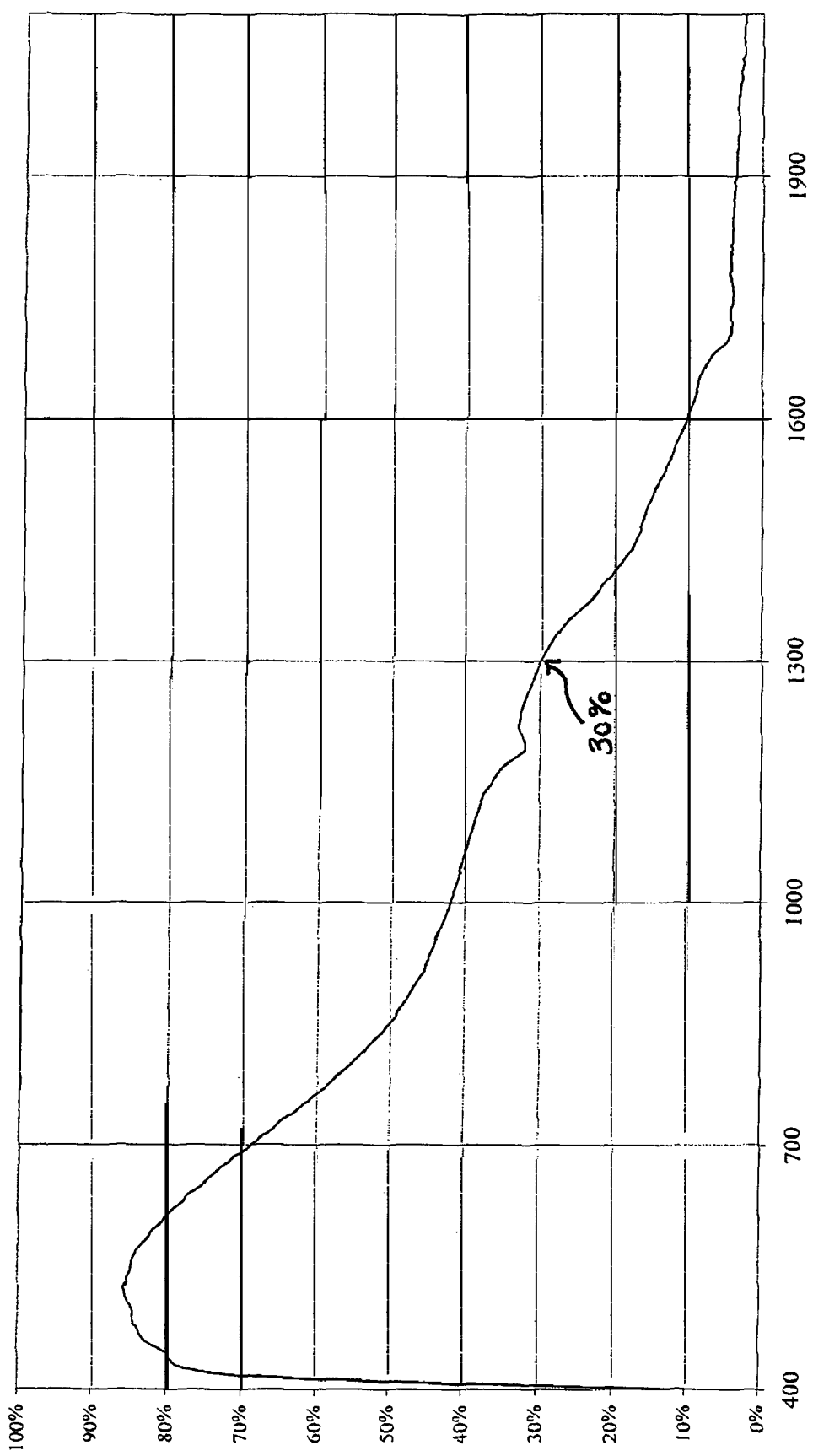

Laminated glazing 10 has a thickness of 4.46 mm when constructed from outer glass ply 11 in 2.1 mm thickness, inner glass ply 12 in 1.6 mm thickness, and IR absorbing interlayer ply 13 in 0.76 mm thickness. IR absorbing interlayer is currently available as SCF Film from Sekisui Chemical Co. Ltd. When glass ply 11 is light-green tinted and glass ply 12 is clear glass, glazing 10 exhibits 82.7% $LT_A$ and 54.9 TE. FIG. 6 shows the transmission curve for this glazing over the wavelength range 400-2100 nm; glazing 10 exhibits 30% transmission in the range 750-1300 nm. At 905 nm, its transmission is 46%. Its overall tint is defined by $a^*=-4.6$ and $b^*=2.2$.

All of these embodiments of the invention are lighter in weight than the green-tinted prior art glazing discussed earlier, all have a TE less than 60% and all have optical transmissions which make them suitable for use with an optical sensor, especially a LIDAR type sensor.

The invention claimed is:

1. A laminated vehicle glazing, suitable for use with an optical sensor, comprising:
    first and second plies of glazing material joined together by a ply of interlayer material between them,
    the first ply of glazing material being a pane of body-tinted glass having a colorant portion consisting of 0.70 to 1.00% by weight total iron (calculated as $Fe_2O_3$), 0 to 1.0% titania (calculated as $TiO_2$) and 0 to 2.0% ceria (calculated as $CeO_2$),
    wherein the glazing has a transmittance of at least 30% through the entire wavelength range of 400 to 2100 nm.

2. A laminated vehicle glazing as claimed in claim 1 wherein the glazing has a transmittance of at least 32% in the wavelength range 750 to 1300 nm.

3. A laminated vehicle glazing as claimed in claim 1 wherein the optical sensor is a light detection and ranging (LIDAR) type of sensor.

4. A laminated vehicle glazing as claimed in claim 1 wherein the glazing has a visible light transmittance ($LT_A$) greater than or equal to 70% and a total energy transmittance (TE) less than or equal to 60% at thicknesses greater than or equal to approximately 4.2 mm.

5. A laminated vehicle glazing as claimed in claim 4 wherein the glazing has a visible light transmittance ($LT_A$) greater than or equal to 75% and a total energy transmittance (TE) less than or equal to 60% at thicknesses greater than or equal to approximately 4.2 mm.

6. A laminated vehicle glazing as claimed in claim 1 wherein the pane of body-tinted glass has a thickness of less than 2.6 mm.

7. A laminated vehicle glazing as claimed in claim 1 wherein the second ply of glazing material is a pane of clear glass.

8. A laminated vehicle glazing as claimed in claim 7 wherein the pane of clear glass has a thickness of less than 2.6 mm.

9. A laminated vehicle glazing as claimed in claim 7 wherein the pane of clear glass has a thickness of less than or equal to around 2.1 mm.

10. A laminated vehicle glazing as claimed in claim 1 having an optical sensor mounted on its innermost surface.

11. A laminated vehicle glazing as claimed in claim 1 having a colour specified by the colour coordinates (D65, 10° observer): $-6 \leq a^* \leq -2$ and $0 \leq b^* \leq 3$.

12. A laminated vehicle glazing as claimed in claim 11 having a colour specified by the colour coordinates (D65, 10° observer): $-5 \leq a^* \leq -3$ and $0.5 \leq b^* \leq 2.5$.

13. A windscreen comprising a laminated vehicle glazing as claimed in claim 1.

14. A laminated vehicle glazing as claimed in claim 1 having a LIDAR type of sensor mounted on its innermost surface.

15. A laminated vehicle glazing as claimed in claim 1 wherein the pane of body-tinted glass has a thickness of around 2.1 mm.

16. A laminated vehicle glazing, suitable for use with an optical sensor, comprising:

first and second plies of glazing material joined together by a ply of interlayer material between them, the first ply of glazing material being a pane of body-tinted glass having a colorant portion consisting of 0.30 to 0.80% by weight total iron (calculated as $Fe_2O_3$), 0 to 1.0% titania (calculated as $TiO_2$) and 0 to 2.0% ceria (calculated as $CeO_2$), and the ply of interlayer material being a solar absorbing material, wherein the glazing has a transmittance of at least 30% through the entire wavelength range of 750 to 1300 nm.

17. A laminated vehicle glazing as claimed in claim 16 wherein the glazing has a transmittance of at least 35% through the entire wavelength range of 750 to 1300 nm.

* * * * *